United States Patent [19]
Buell

[11] Patent Number: 5,209,319
[45] Date of Patent: May 11, 1993

[54] MOTORCYCLE FRONT SUSPENSION
[75] Inventor: Erik F. Buell, Mukwonago, Wis.
[73] Assignee: Buell Motor Co., Mukwonago, Wis.
[21] Appl. No.: 852,636
[22] Filed: Mar. 17, 1992
[51] Int. Cl.⁵ .................. B62K 25/08; B62K 21/02
[52] U.S. Cl. .................... 180/219; 280/276; 280/283
[58] Field of Search ............. 180/219; 280/275, 276, 280/283

[56] References Cited
U.S. PATENT DOCUMENTS

| | | | |
|---|---|---|---|
| 2,592,981 | 4/1952 | Violet | 280/276 |
| 2,953,395 | 9/1960 | Turner | 280/276 |
| 4,180,280 | 12/1979 | Doveri | |
| 4,526,249 | 7/1985 | Parker | 180/219 |
| 4,741,545 | 5/1988 | Honma et al. | 280/276 X |
| 4,756,547 | 7/1988 | Trema | 180/219 X |
| 4,854,412 | 8/1989 | Tidwell | 180/219 |

FOREIGN PATENT DOCUMENTS 294866 12/1988 European Pat. Off. .
943233 10/1948 France .

Primary Examiner—Margaret A. Focarino
Assistant Examiner—Carla Mattix
Attorney, Agent, or Firm—Andrus, Sceales, Starke & Sawall

[57] ABSTRACT

A motorcycle front wheel suspension assembly for interconnecting the main frame and the front wheel of a motorcycle includes a main strut having upper and lower portions with the lower portion connected to the front wheel and a secondary strut that is substantially parallel with and offset from the main strut member with its lower end terminating at a point outside the circumference of the wheel.

10 Claims, 2 Drawing Sheets

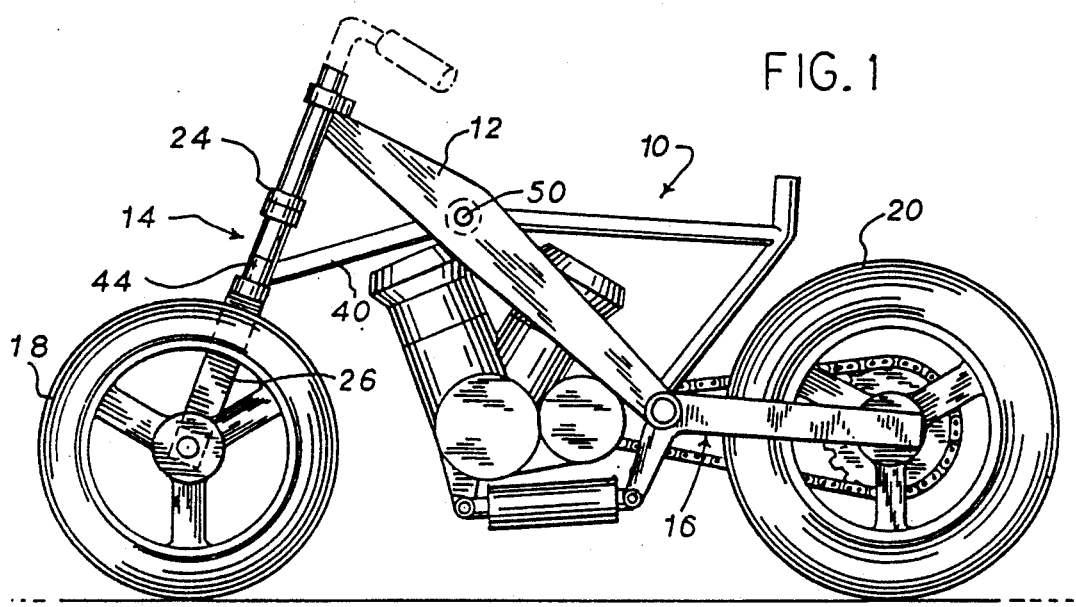
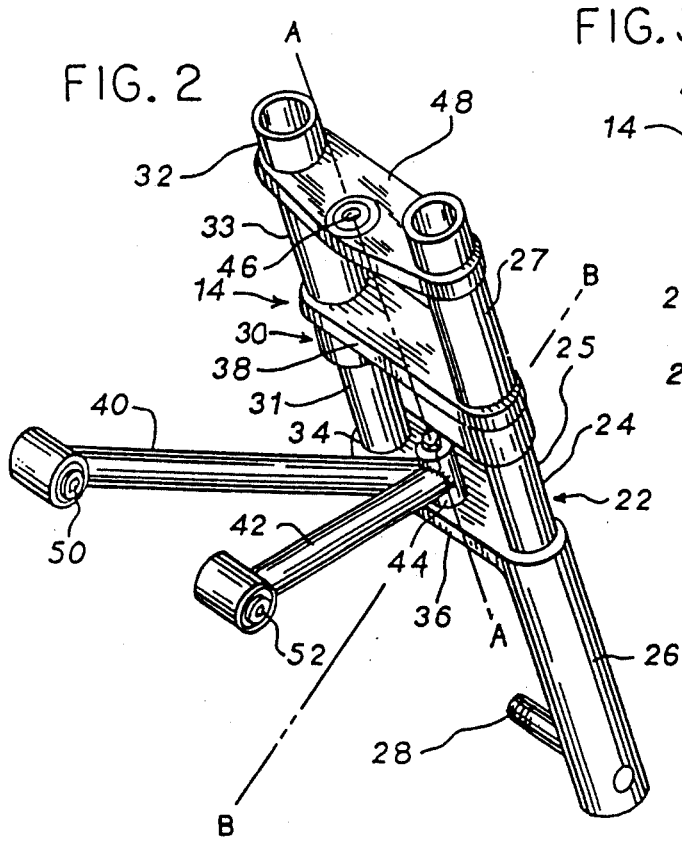
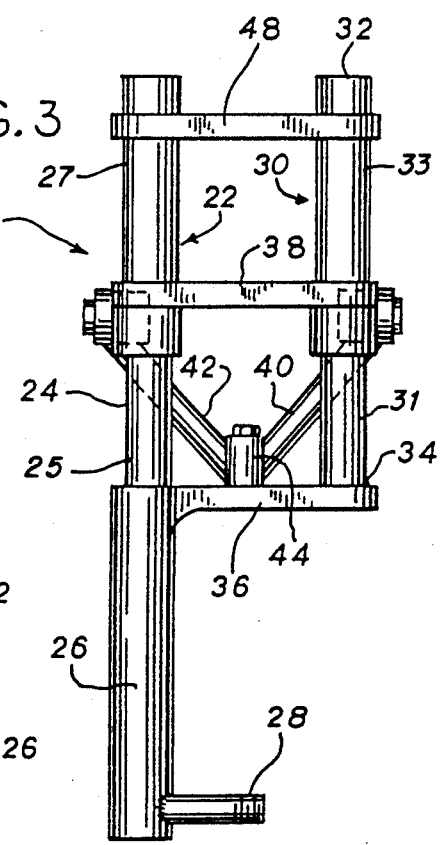

MOTORCYCLE FRONT SUSPENSION

BACKGROUND OF THE INVENTION

The present invention relates to a motorcycle front wheel suspension assembly and more particularly to a front wheel suspension that utilizes only a single main strut that extends inwardly beyond the circumference of the wheel.

The typical front wheel suspension utilized on motorcycles is in the form of a tubular front fork in which a pair of parallel telescoping arms extend downwardly on each side of the front wheel and are connected in some manner to the front wheel axle. Typically, both spring and damping means are contained within the telescoping tubular arms.

One of the major drawbacks to a system of this type is its lack of stiffness. The stiffness problems of this design are caused by the fact that the load is transmitted into the frame via three closely spaced clamps that connect the front wheel suspension to the frame.

Another drawback of the prior art system is that the telescoping arms of the fork do not readily permit simple wheel changes. The prior art system requires that the axle be removed completely and that the brake system be disconnected in order to replace the front wheel. This makes wheel and tire changes extremely slow and complicated.

It is an object of the present invention to provide a suspension assembly for the front wheel of a motorcycle that has all the desired stiffness and yet readily allows for front wheel and tire changes.

SUMMARY OF THE INVENTION

A suspension assembly for interconnecting the main frame and the front wheel of a motorcycle includes a main strut member that has a lower portion extending downwardly and has a connecting arm extending inwardly from its lower end for joining the main strut member to the front wheel. An upper portion of the main strut is telescopically connected to the lower portion.

In accordance with another aspect of the invention, the assembly is provided with a secondary strut member that is substantially parallel and offset from the main strut member. The secondary strut member has an upper and lower end and the lower end terminates at a point radially outside the circumference of the wheel.

In accordance with yet another aspect of the invention, a coupling is provided for joining the main strut to the secondary strut and maintaining the parallel relationship between the struts.

In accordance with still another aspect of the invention, connectors are provided for pivotally connecting the suspension assembly to the main frame of the motorcycle.

The present invention thus provides a motorcycle front suspension assembly having the desired stiffness and yet facilitating the changing of the front wheel and/or tire.

BRIEF DESCRIPTION OF THE DRAWINGS

The drawings illustrate the best method presently contemplated of carrying out the invention.

In the drawings:

FIG. 1 is a side view of a motorcycle utilizing the front wheel suspension assembly of the invention;

FIG. 2 is a perspective view of the front wheel suspension assembly of the invention;

FIG. 3 is a front view of the front wheel suspension of FIG. 2;

DETAILED DESCRIPTION OF THE INVENTION

Figure 4:
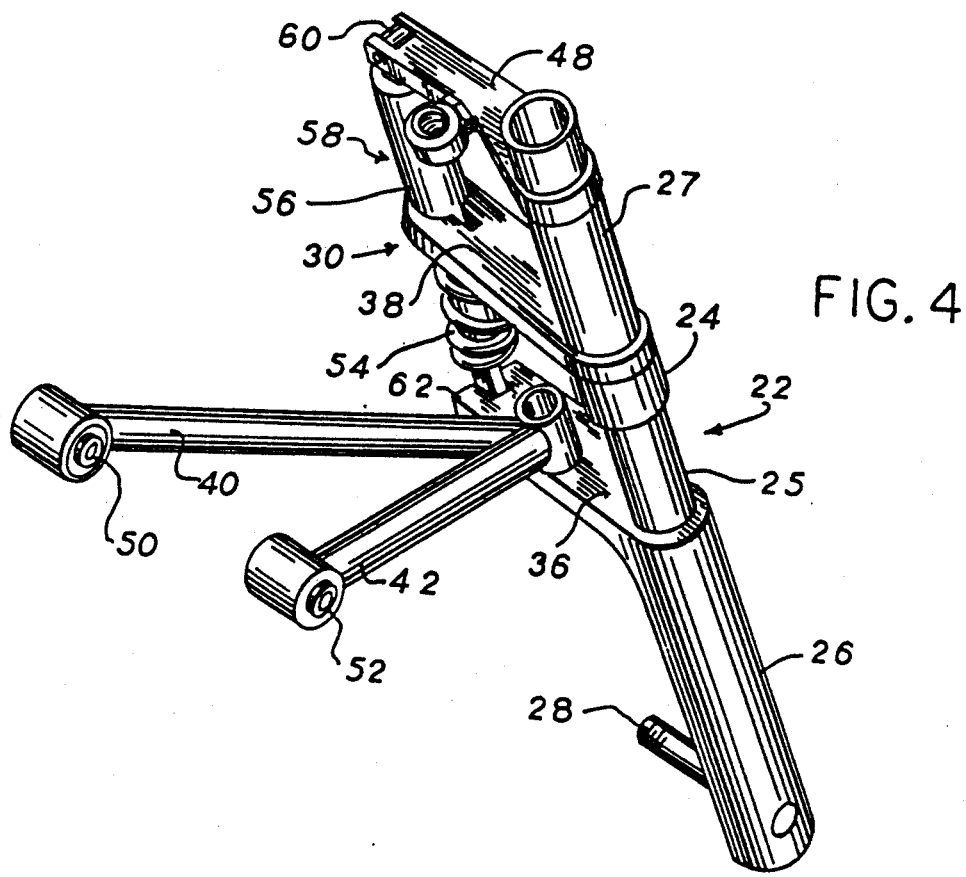
FIG. 4 is a perspective view of an alternate embodiment of the front wheel suspension assembly.

As shown in FIG. 1, a motorcycle 10 includes a main frame 12 to which is connected a front wheel suspension 14 at its forward end and a rear wheel suspension 16 at its rear end. The front and rear wheel suspensions connect front wheel 18 and rear wheel 20 to the motorcycle and transmit the forces and loads incurred by these wheels to main frame 12.

As seen in FIGS. 2 and 3, front wheel suspension assembly 14 includes a main strut member 22 having an upper portion 24 that is connected as a sprung member to a lower portion 26 that has a connecting arm 28 extending inwardly from its lower end for joining main strut member 22 to front wheel 18. Upper portion 24 includes an internal tubular member 25 that slides within external tubular member 27.

Front wheel suspension assembly 14 is also provided with a secondary strut member 30 that is substantially parallel with and offset from main strut member 22. Secondary strut member 30 is provided with upper and lower ends 32 and 34 respectively and lower end 34 terminates at a point outside the circumference of wheel 18 so that one side of wheel 18 is unobstructed by any suspension framework and thus, wheel 18 or its associated tire can easily be changed from the unobstructed side of front wheel suspension 14. Secondary strut member 30 includes an internal tubular member 31 that slides within external tubular member 33.

Either one or both of upper portion 24 and secondary strut 30 may contain a spring and/or damper as is well known in the art for providing a shock absorbing function.

Coupling means for joining main strut 22 to secondary strut 30 and maintaining their parallel relationship is provided in the form of lower cross member 36 and a brace member 38 is disposed above lower cross member 36 and between main strut member 22 and secondary strut member 30 to provide additional stability and enhance the stiffness of front wheel suspension 14.

While main strut member 22 and secondary strut member 30 are shown as being located in a plane substantially perpendicular to the centerline B-B of motorcycle 10, it should be appreciated that secondary strut member 30 could be located in a position offset from the steering axis line A—A in FIG. 2 that extends through bearings 44 and 46, but in line with the centerline of motorcycle 10.

Connecting means for pivotally connecting suspension assembly 14 to main frame 12 is provided in the form of a pair of arms 40 and 42 that are pivotally connected at their forward end to cross member 36 by means of a spherical bearing 44. The connecting means also includes a pivotal framework connection in the form of spherical bearing 46 located in an upper cross member 48 that is disposed between upper portion 24 of main strut member 22 and upper end 32 of secondary strut member 30.

The rear ends of arms 40 and 42 are pivotally connected to framework 12 by means of single axis ball roller bearings 50 and 52. The three connection points i.e. 46, 50 and 52 between suspension assembly 14 and framework 12 are widely spaced and thus can transmit tire forces and loads to the framework much more efficiently than the conventional front wheel suspensions. It should be appreciated that the length of arms 40 and 42 can be varied as well as their connection points along framework 12 so as to vary the handling characteristics of motorcycle 10.

FIG. 4 illustrates an alternate embodiment of front wheel suspension 14 in which secondary strut 30 is in the form of a spring 54 over damper 56 shock absorber unit 58 which is pivotally mounted at each end by means of single axis bearings 60 and 62 in upper cross member 48 and lower cross member 36 respectively with the longitudinal axes of bearings 60 and 62 perpendicular to the longitudinal axes of cross members 36 and 48.

Figure 5:
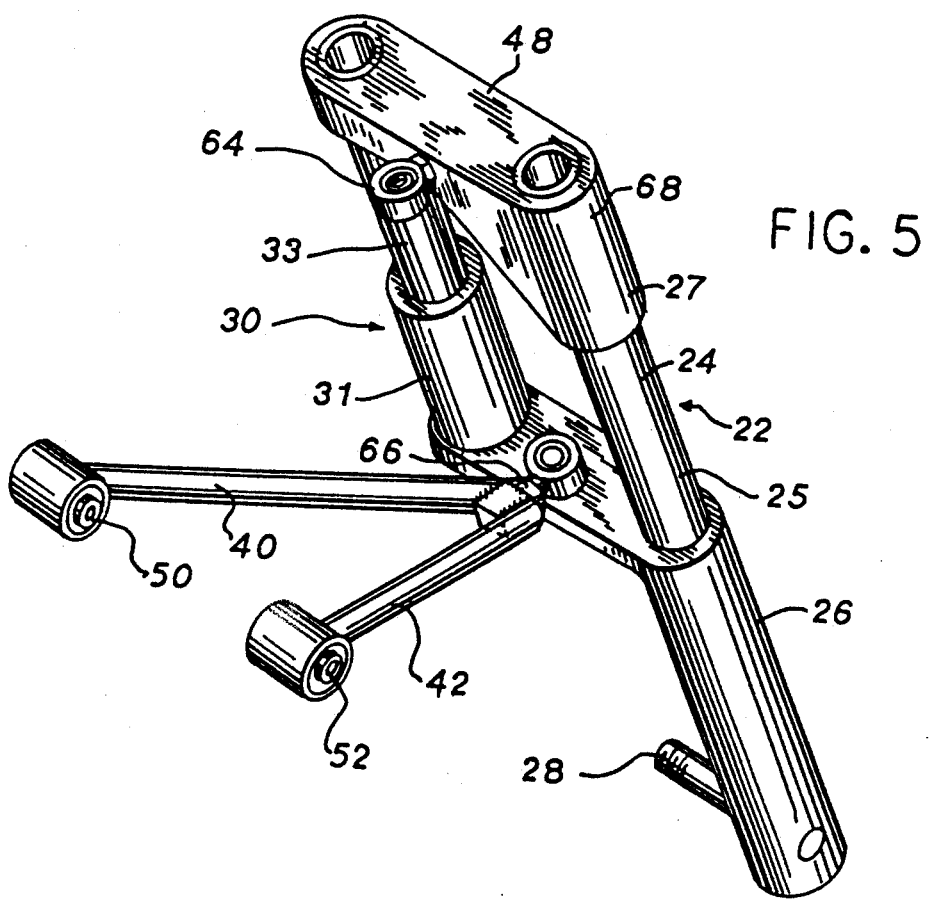
FIG. 5 is a perspective view of yet another alternate embodiment of the front wheel suspension assembly

FIG. 5 is illustrative of yet another embodiment in which spherical bearings 44 and 46 have been replaced with adjustable rod end type spherical bearings 64 and 66. The use of such threaded adjustable bearings permits the individual and independent adjustment of the rake angle, the trail and/or the wheel base.

Also in the embodiment of FIG. 5 the sidewalls 68 on the righthand side of upper cross member 48 have been extended downwardly to provide additional structure and stability so that brace 38 may be eliminated from this embodiment.

Various modes of carrying out the invention are contemplated as being within the scope of the following claims particularly pointing out and distinctly claiming the subject matter regarded as the invention.

I claim:

1. In a motorcycle of the type having front and rear wheels connected to a main frame, a suspension assembly for interconnecting the main frame having a steering shaft axis and the front wheel of the motorcycle comprising:
   a main strut member having a lower portion extending downwardly and having a connecting arm extending inwardly from said main strut member's lower end for joining said main strut member to the front wheel, and an upper portion telescopically connected to said lower portion,
   a secondary strut member substantially parallel with and offset from said main strut member and from the steering shaft axis, said secondary strut member having upper and lower ends with said lower end terminating at a point outside the circumference of the wheel,
   coupling means for joining said main strut member to said secondary strut member and maintaining the parallel relationship between said struts, and
   connecting means for pivotally connecting the suspension assembly to the main frame of the motorcycle.

2. The suspension assembly defined in claim 1 further comprising:
   a brace member disposed between said main strut member and said secondary strut member.

3. The suspension assembly defined in claim 1 wherein said secondary strut member comprises:
   a spring over damper shock absorber unit.

4. The suspension assembly defined in claim 1 wherein said connecting means comprises:
   a pair of arms mounted at their forward ends for pivotal movement to said coupling means and extending rearwardly for pivotal connection at their rear ends to substantially opposite sides of the main frame, and
   a pivotal framework connection located in an upper cross member disposed between said upper portion of said main strut and said upper end of said secondary strut.

5. The suspension assembly defined in claim 4 wherein said forward ends of said pair of arms are connected to a single spherical bearing.

6. The suspension assembly defined in claim 4 wherein said rear ends of said pair of arms are connected to the main frame by means of single axis roller bearings.

7. The suspension assembly defined in claim 1 wherein said secondary strut member comprises shock absorbing means.

8. The suspension assembly defined in claim 4 wherein said secondary strut member comprises shock absorbing means.

9. The suspension assembly defined in claim 8 wherein said shock absorbing means comprises a spring over damper shock absorber having an upper end pivotally connected to said upper cross member which includes a longitudinal axis and a lower end pivotally connected to said coupling means which includes a longitudinal axis;
   the axis of said upper end pivotal connection being substantially perpendicular to the longitudinal axis of said upper cross member and the axis of said lower end pivotal connection being substantially perpendicular to the longitudinal axis of said coupling means.

10. In a motorcycle of the type having front and rear wheels connected to a main frame, a suspension assembly for interconnecting the main frame and the front wheel of the motorcycle comprising:
   a main strut member having a lower portion extending downwardly and having a connecting arm extending inwardly from said main strut member's lower end for joining said main strut member to the front wheel, and an upper portion telescopically connected to said lower portion,
   a secondary strut member substantially parallel with and offset from said main strut member, said secondary strut member having upper and lower ends with said lower end terminating at a point outside the circumference of the wheel,
   coupling means for joining said main strut member to said secondary strut member and maintaining the parallel relationship between said strut members, and
   a pair of arms mounted at their forward ends for pivotal movement to said coupling means and extending rearwardly for pivotal connection at their rear ends to substantially opposite sides of the main frame, and
   an upper cross member between said upper portion of said main strut member and said upper end of said secondary strut member, said cross member having spherical bearing means mounted thereon to provide pivotal connection between said upper cross member and the main frame.

* * * * *